United States Patent [19]

Roberts

[11] 3,855,582

[45] Dec. 17, 1974

[54] PARALLEL BIASED PHOTODETECTOR MATRIX

[75] Inventor: Donald L. Roberts, San Diego, Calif.

[73] Assignee: NCR Corporation, Dayton, Ohio

[22] Filed: June 1, 1973

[21] Appl. No.: 366,178

[52] U.S. Cl.. 340/173 LS, 340/173 LM, 340/173 R

[51] Int. Cl. .............................................. G11c 11/42

[58] Field of Search... 340/173 R, 173 LM, 173 LT, 340/173 LS

[56] References Cited

UNITED STATES PATENTS

| | | | |
|---|---|---|---|
| 3,197,653 | 7/1965 | Anderson | 340/173 R |
| 3,201,764 | 8/1965 | Parker | 340/173 R |
| 3,689,900 | 9/1972 | Chen | 340/173 LS |

*Primary Examiner*—Terrell W. Fears
*Attorney, Agent, or Firm*—J. T. Cavender; James H. Phillips

[57] ABSTRACT

A parallel biased photoconductor matrix comprises a plurality of light detection cells. Each cell has a pair of series connected low resistance diodes having a common junction. The series connected diodes are associated with two mutually adjacent row conductors. A photoconductor diode is connected between an associated column conductor and the common junction of the diodes. When the photoconductor diode is activated and the series connected diodes are forward biased, the current of the photoconductor is switched and employed as an output signal by means connected to the associated column conductor. To increase the switching speed of the matrix the series connected diodes may be connected to suitable means for back biasing of the pair of series connected diodes.

6 Claims, 5 Drawing Figures

PARALLEL BIASED PHOTODETECTOR MATRIX

BACKGROUND OF THE INVENTION

This invention relates to a photoconductor matrix suitable for employment in optical memory systems.

Heretofore light detection cells employ pairs of diodes in a back-to-back configuration. In addition, information is read from each memory cell by a need for only addressing that one row conductor and that one column conductor associated with that particular cell which is addressed. These prior art cells have a signal output which is a function of detected cell voltage only. These prior art memory systems and associated cells are noisy when switching which introduces errors into the output signals of the memory cell. These prior art cells can only be employed in limited circuitry applications.

An object of this invention is to provide a detector matrix for an optical activated memory system which has no, or a very low magnitude of, noise when switching occurs therein.

Another object of this invention is to provide an optical detector cell which will switch current.

A further object of this invention is to provide a read only memory cell which will switch current which is converted into an output signal from the cell as a means of reading information "stored" therein.

SUMMARY OF THE INVENTION

In accordance with the teachings of this invention there is provided a parallel biased photoconductor cell comprising a pair of row conductors, a pair of low resistance diodes, a column conductor and a photoconductor diode. The low resistance diodes are series connected between the two row conductors and share a common terminal. The photoconductor diode is connected between the column conductor and the common terminal of the series connected diodes. The arrangement is such that when the series connected diodes are forward biased, and the photoconductor diode is activated, the current of the photoconductor diode is switched and detected as an output signal of the cell via the column conductor. Suitable means are connected to the column conductor to detect the current switched and transmit an output signal indicative of the magnitude of the current switched.

Additionally, a plurality of the cells may be arrayed in a matrix comprising a plurality of rows and columns of cells. An optical system embodying a source of radiant energy and an optical mas provides suitable means for selectively activating the photoconductor cells of the matrix. Other means associated with the matrix receives the output signals from the plurality of column conductors. The cells may be interrogated in sequence or at random. The switching speed of the memory cell and the memory matrix embodying the same is increased by back biasing the series connected diodes during the period the associated cell is not interrogated.

DESCRIPTION OF THE PREFERRED EMBODIMENT

Figures 1, 2:
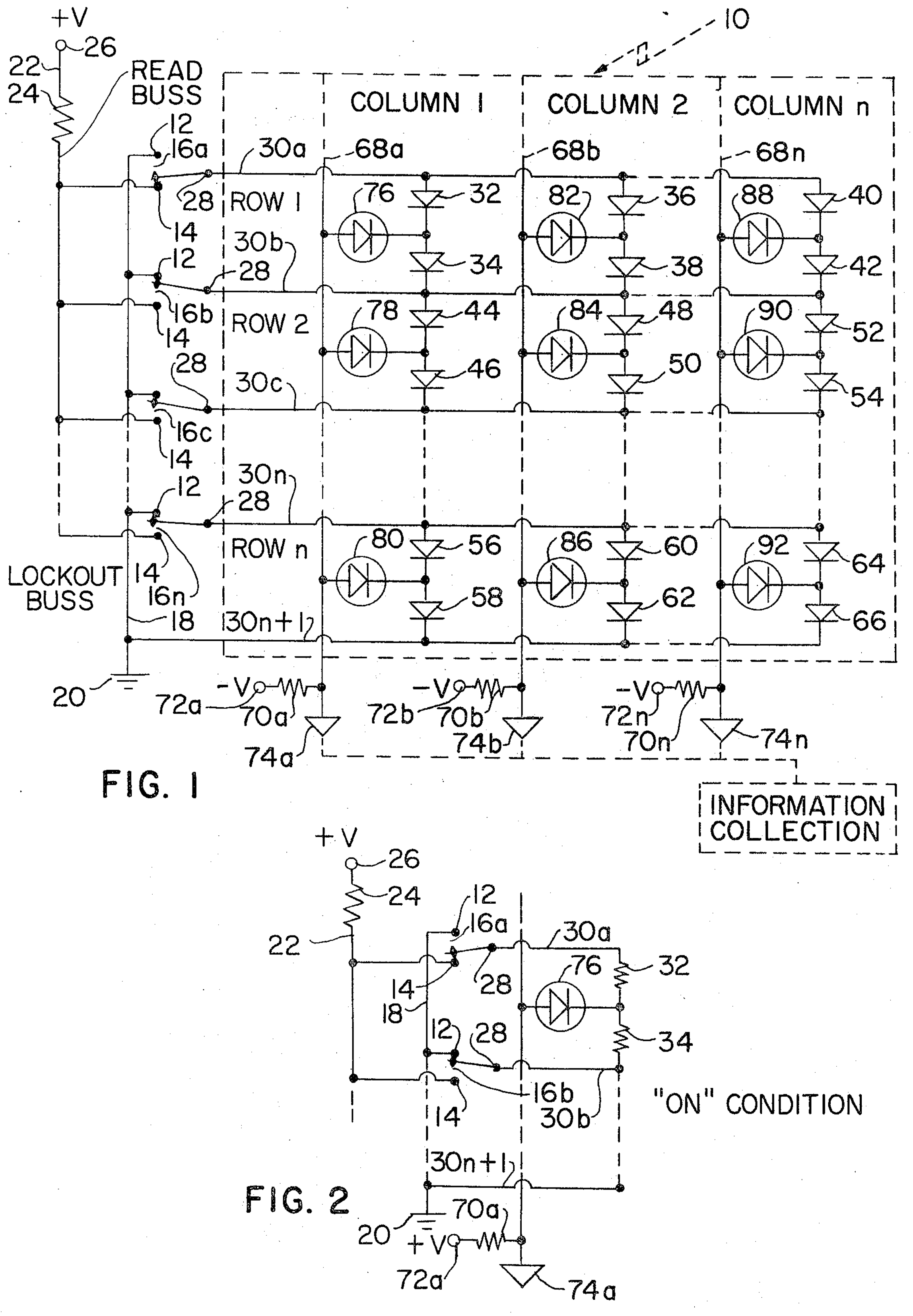
FIG. 1 is a schematic of the detector matrix embodying a plurality of photoconductor cells made in accordance with the teachings of this invention.
FIG. 2 is an equivalent schematic of a typical cell of the matrix of FIG. 1 in an "on" state.

With reference to FIG. 1 there is shown a parallel biased photoconductor matrix 10. The matrix 10 is designed to switch currents in contrast to prior art matrices which switch voltage only. The matrix 10 is employed with optical masks (not shown) and an illuminating source (not shown) to enable the matrix 10 to have the flexibility to readily change the program of the matrix 10 whenever desired with relative ease and without having to add or remove components from the matrix arrangement.

The matrix 10 comprises a plurality of columns 1–*n* and a plurality of rows 1–*n*. As indicated in the matrix 10, a pair of diodes, connected in series, is associated with each mutually adjacent pairs of row conductors. A photoconductor diode is associated with each pair of series connected diodes and a column conductor. Preferably, since, at this time, photoconducting diodes conduct currents in the microamperage range and in some instances up to a low amperage range, each of the series connected diodes is a low resistance diode. Sources of potential of appropriate polarities and a plurality of switching means are provided for sequentially energizing the column and row conductors as required.

For example, one terminal 12 of each of a plurality of switching means 16*a*–16*n* is connected to a reference potential 20 via such, for example, as ground lock out buss 18. The other terminal 14 of each of the switching means 16*a*–16*n* is connected to a power or read buss 22. The power buss 22 is series connected via resistor 24 to power terminal 26 to which is connected a power source of a first polarity.

Each switching means 16*a*–16*n* has a terminal 28 which is connected to the associated one of a plurality of row conductors 30*a*–30*n*. Associated with row conductors 30*a* and 30*b* is one or more pairs of series connected diodes such, for example, as diodes 32 and 34 in unit cell column 1, row 1, diodes 36 and 38 in unit cell column 2, row 1 and diodes 40 and 42 in column *n*, row 1. Associated with row conductors 30*b* and 30*c* is one or more pairs of series connected diodes such, for example, as diodes 44 and 46 in column 1, row 2, diodes 48 and 50 in unit cell column 2, row 2 and diodes 52 and 54 of unit cell column *n*, row 2. Associated with row conductors 30*n* and 30*n*+1 is one or more pairs of series connected diodes such, for example, as diodes 56 and 58 of unit cell column 1, row *n*, diodes 60 and 62 of unit cell column 2, row *n* and diodes 64 and 66 of unit cell column *n*, row *n*.

The arrangement of the pairs of diodes in the array 10 is such that when one or more of the row conductors 30*a*–30*n* is connected to the power or read buss 22, every pair of diodes associated with that particular row conductor is energized making each of the pairs of series connected diodes conductive as well. Therefore, in each row every pair of series connected diodes is rendered conductive thereby providing a plurality of parallel circuits comprising a pair of adjacent row conductors when a particular associated row conductor is energized by connection to the buss 22.

Within each cell defined by the intersection of mutually adjacent pairs of row conductors and a column conductor is a photoconducting diode which is associated with that particular column conductor and a pair of series connected diodes. For example, in FIG. 1, there is illustrated a plurality of column conductors 68*a*–68*n*. Associated with each of the column conductors 68*a*–68*n* is one or more photoconducting diodes. Each of the column conductors 68*a*–68*n* is connected through a respective series resistor 70*a*–70*n* and via respective power terminals 72*a*–72*n* to a power source of a desired polarity. The signal output of each column conductor 68*a*–68*n* is connected directly to the next signal receiving means or preferably through respective amplifying means 74*a*–74*n* to the next input of the connected signal receiving means. As an example, photoconducting diodes 76, 78 and 80 are associated with column conductor 68*a* and corresponding pairs of diodes in the associated cell as well. Each photoconducting diode when activated by a radiant source conducts between the associated column conductor and the terminal mutually shared by the series connected diodes of the cell. In a like manner, photoconducting diodes 82, 84 and 86 are associated with column conductor 68*b* and photoconducting diodes 88, 90 and 92 are associated with column conductor 68*n*.

The array 10 functions in conjunction with a source of radiant energy (not shown) and an optical mask (not shown) as a read only memory (ROM). One or more cells may be rendered conductive simultaneously but the functioning of the array is up to one's individual requirements. For example, suppose one desires the optical array 10 to function in a manner whereby only information relative to each column is "read" at a time. Therefore, depending upon the number of photoconducting diodes activated by the source of illumination, the intensity of the output signal which is transmitted will vary. Alternately, each individual cell can be interrogated separately to "read" the information or all the cells in one row can be read at one time.

Referring now to FIGS. 1 and 2 there is illustrated the functioning of an individual cell such, for example, as the cell defined as in column 1, row 1. Clock means (not shown) operates the switching means 16*a*–16*n* to connect row conductor 30*a* to the read buss 22 via contact 14. The remainder of the switching means 16*b*–16*n* connect the associated row conductors 30*b*–30*n* to the lockout buss 18 via respective terminals 12. The only complete circuit for current to flow therein is in each of the cells associated with row 1. All the pairs of diodes 32 and 34, 36 and 38 and 40 and 42 are rendered conductive and current flow occurs from the power source to the reference potential via read buss 22, the row conductor 30*a*, a plurality of parallel circuits created by the plurality of pairs of diodes associated with row 1 being rendered conductive, row conductor 30*b* and lockout buss 18. The pairs of diodes act as series connected low resistance resistors. No other cells are energized because their associated row conductors remain connected to the lockout buss 18 and consequently are connected to a reference potential and no current can flow.

Depending upon the optical mask, one or more of the photoconducting diodes 76, 82 and 88 in the plurality of cells associated with row 1 are illuminated by the light source. Suppose, for example, only photoconducting diode 76 is illuminated. Diode 76 is rendered conductive and amplifier 74*a* senses the signal output of the cell and transmits a signal indicative of the activation of the cell. In a similar manner if diodes 82 or 88 or both had been rendered conductive, one or the other, or both, amplifier means 74*b* and 74*n* will sense the signal output of the respective diodes 82 and 88. The signal output of the amplifiers 74*b* and 74*n* is indicative of the signal output of the corresponding cell and also of the information stored by the optical mask means. Likewise, if all the cells associated with a column is sensed simultaneously, the respective amplifier means 74*a*–74*n* determines the intensity of the signal output from one or more signals and the amplifier means transmit a signal which is related to the input signal thereto.

In summary, a bias voltage is applied sequentially or at random, to each of the row conductors 30*a*–30*n*. If at the time a row conductor is biased, and one or more of the photoconducting diodes is activated by the optical mask illuminated source, a signal is switched by the associated cell. The signal in this instance is current flow rather than a potential measurement as in prior art cells. The amount of photoconductive current switched, or intensity of signal output is dependent on the light illumination on the photoconductor diode.

Figure 3:
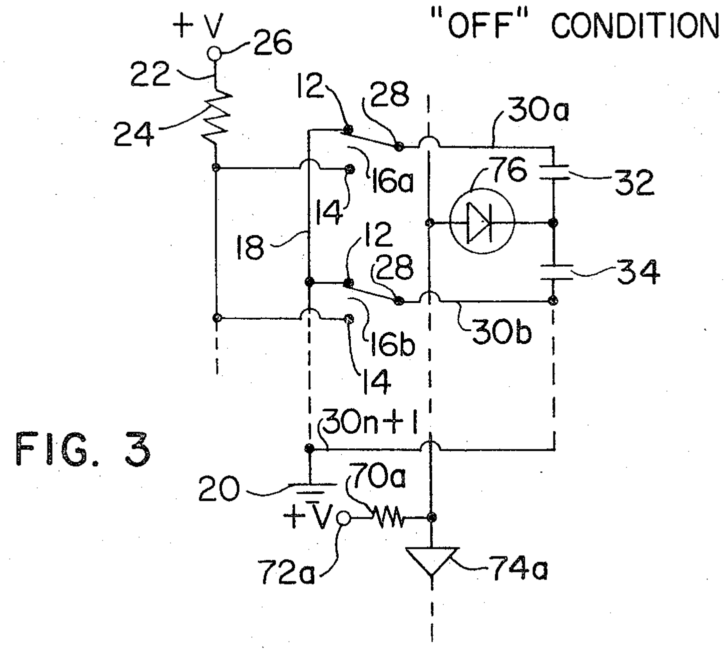
FIG. 3 is an equivalent schematic of the typical cell of FIG. 2 in an "off" state.

Referring now to FIG. 3, a typical cell configuration such, for example, as the cell defined by column 1, row 1, is shown in an "off" condition. Row conductor 30*a* is not connected to read buss 22. Instead row conductor 30*a* is connected to lockout buss 18. Therefore, diodes 32 and 34, being nonconductive, appear to be capacitors in the cell circuit. Consequently if photoconductor 76 is rendered conductive through the optical masking means, the apparent capacitor effect of the diodes 32 and 34 causes the cell circuit to be "open" and no switching of photoconductive current occurs and there is no "reading" of the cell.

Although the invention has been illustrated for one set of polarities, it is to be noted that the polarities can be reversed at connectors 20, 26, and 72*a*–72*n* and the diodes so arranged in the cells to permit the functioning of the cells in a similar manner as described heretofore.

Figure 4:
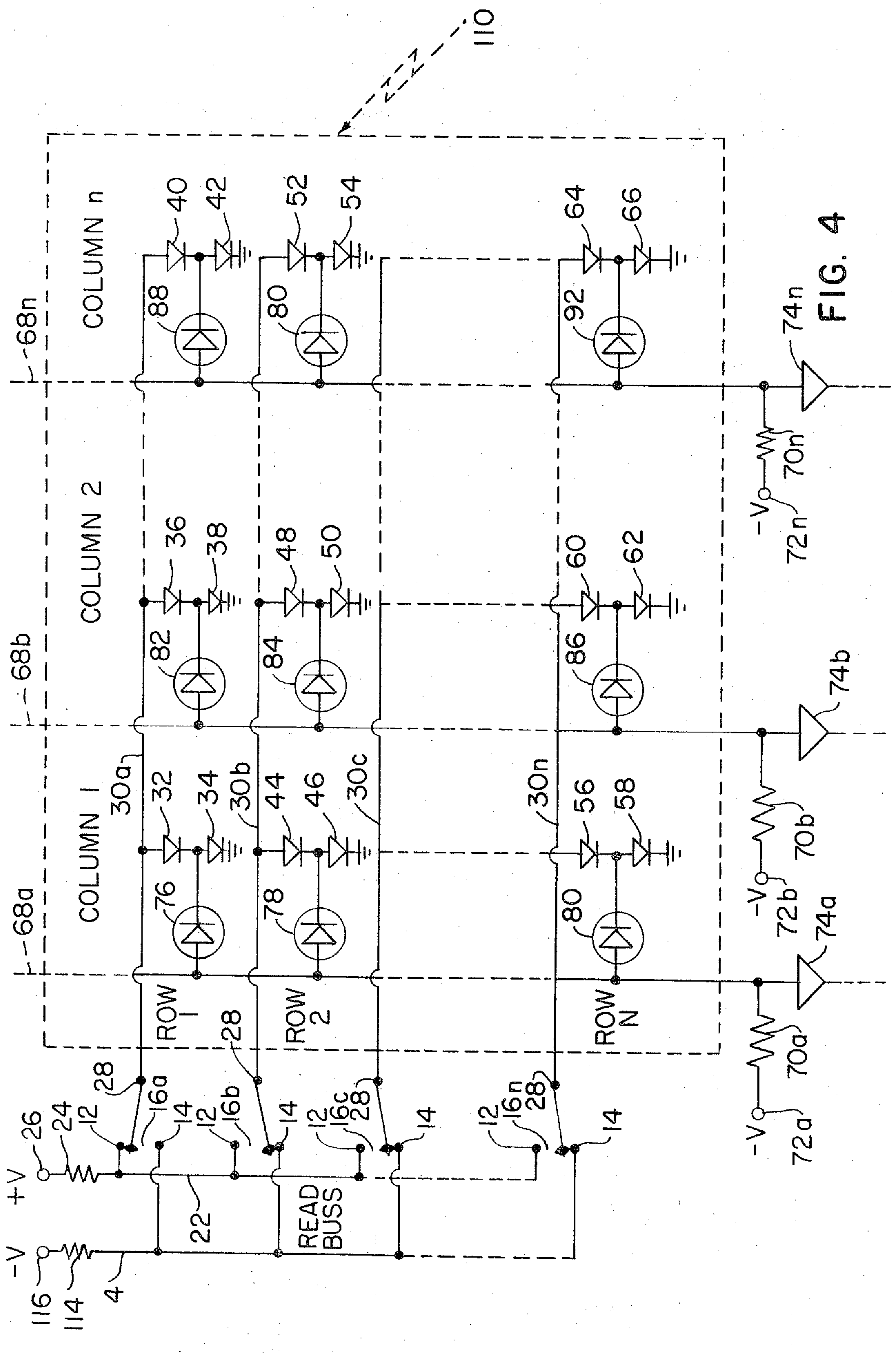
FIG. 4 is a schematic of an alternate embodiment of the memory matrix of FIG. 1.

FIG. 4 is illustrative of a matrix 110 which is a modification of the matrix 10 of FIG. 1 to increase the switching speed and the reading of the array of cells. All components of the matrix 110 which are denoted by the same reference numerals as in the matrix 10 are the same as, and function in the same manner as, previously described. The modification includes a lockout buss 4 series connected through a resistor 114 via terminal 116 to a negative source of potential, and diodes 34, 38, 42, 46 etc. are connected to ground. Buss 114 is connected to row conductors 30*a*–30*n* to back bias each of the plurality of pairs of series connected diodes when connected thereto. At "turn off" each of the plurality of cells associated with a particular row conductor 30*a*–30*n* is connected through the associated switch 16*a*–16*n* to the lockout buss 114. Each pair of series connected low resistance diodes in each associated cell is now back biased reducing the capacitance of the diodes and also turning them off more quickly. The quicker "turn off" and reduction in capacitance enables the array 110 to switch current signals more quickly.

Figure 5:
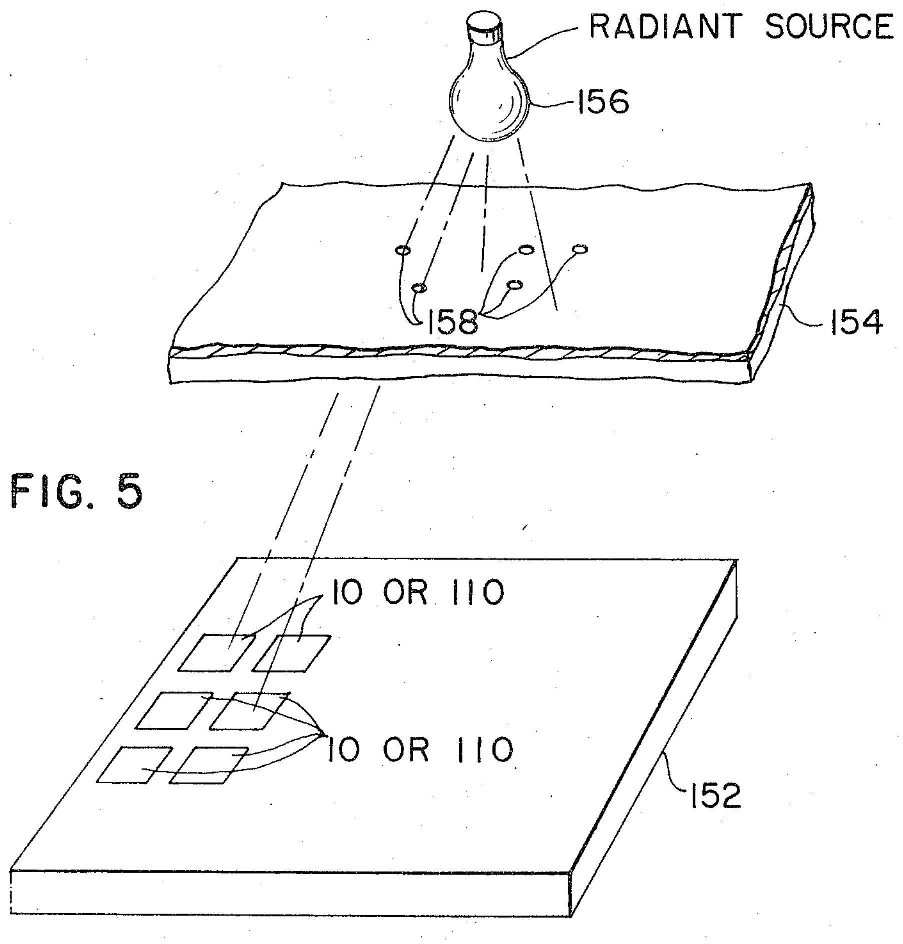
FIG. 5 is a diagram of a memory system embodying the detector matrix of this invention.

The matrices of this invention are particularly suitable for use in an integrated circuit format of microelectrics. For example, with reference to FIG. 5, a matrix 10 or 110 comprising a plurality of cells made in accordance with the teachings of this invention is fabricated in a semiconductor chip 152. Suitable microelectric circuitry is provided for connections biasing the components of the matrix and to capture any current switched as an output signal to be transmitted from the matrix. In functioning as a read only memory (ROM) an optical mask 154 is selectively positioned between a light source 156 and the matrix. The mask 154 is permanently fixed in position or maybe movable. Apertures 158 are provided in the mask to permit passage of light from the light source 156 to selected photoconductor diodes in a matrix thereby causing them to become conductive. The current of the photoconductor switch is switched and employed as an output signal if the series connected diodes associated with the conductive photoconductor diode is forward biased. The apertures 158 may be of a constant area opening or a variable area in order that the current of the photoconductor diode may be constant or varied. The light source 156 is of any particular wave length of light which will activate the photoconductor diode. Alternately, the mask 154 could be a holographic plate and the light source 156 could be a laser beam.

What is claimed is:

1. A parallel biased photoconductor cell comprising: first and second row conductors;

a first source potential connected to said first row conductor;

a second source of potential connected to said second row conductor;

a pair of diodes series connected in forward-biased disposition between said first and second row conductors, said diodes having a common junction therebetween;

a column conductor;

a photoconductor diode connected between said column conductor and said common junction; and detector means connected to said column conductor for sensing a flow of current through said column conductor and said photoconductor diode and for issuing a signal which is a function of the sensed current.

2. The parallel biased photoconductor cell of claim 1 which further includes switching means for selectively connecting said first row conductor to said first source of potential.

3. The parallel biased photoconductor cell of claim 2 in which said second source of potential is a reference potential.

4. The parallel biased photoconductor cell of claim 2 in which said first and second sources are of opposite polarity.

5. A photoconductor matrix array comprising:

a plurality of row conductors;

a plurality of column conductors;

first and second sources of potential;

a plurality of switch means, each of said switch means being connected between one of said row conductors and said first and second sources of potential to provide selective, alternative current paths therebetween;

a plurality of memory cells arranged in rows and columns, each said memory cell being defined by an adjacent pair of said row conductors and one of said plurality of column conductors;

a pair of diodes series connected in forward-biased disposition between said pair of row conductors associated with each cell, said diodes having a common junction therebetween;

a plurality of photoconductor diodes, each of said photoconductor diodes being connected between said column conductor associated with each said cell and said common junction of said series connected diodes included within said cell; and a plurality of detector means, each of said detector means being connected to one of said plurality of column conductors for sensing a current flow through said column conductor and any of said photoconductor diodes connected to said column conductor and for issuing a signal which is a function of the sensed current.

6. The memory matrix of claim 5 in which said first and second sources of potential are of opposite polarity.

* * * * *